United States Patent [19]

Brode et al.

[11] Patent Number: 4,579,942

[45] Date of Patent: Apr. 1, 1986

[54] POLYSACCHARIDES, METHODS FOR PREPARING SUCH POLYSACCHARIDES AND FLUIDS UTILIZING SUCH POLYSACCHARIDES

[75] Inventors: George L. Brode, Bridgewater, N.J.; James P. Stanley, Pleasantville, N.Y.; Emmett M. Partain, III, Somerville, N.J.

[73] Assignee: Union Carbide Corporation, Danbury, Conn.

[21] Appl. No.: 654,595

[22] Filed: Sep. 26, 1984

[51] Int. Cl.$^4$ .................. C08B 11/00; C08B 11/08; C08B 11/193

[52] U.S. Cl. ..................... 536/84; 106/170; 536/90; 536/91

[58] Field of Search ................ 536/84, 90, 91; 106/170

[56] References Cited

U.S. PATENT DOCUMENTS

| | | | |
|---|---|---|---|
| 3,727,688 | 4/1973 | Clampitt | 166/283 |
| 3,848,673 | 11/1974 | Clampitt et al. | 166/294 |
| 3,978,928 | 9/1976 | Clampitt | 166/294 |
| 4,001,210 | 1/1977 | Engelskirchen et al. | 106/170 |
| 4,013,821 | 3/1977 | Engelskirchen et al. | 106/170 |
| 4,096,326 | 6/1978 | Reid | 536/95 |
| 4,523,010 | 6/1985 | Lukach et al. | 536/91 |

Primary Examiner—Ronald W. Griffin
Attorney, Agent, or Firm—Henry H. Gibson

[57] ABSTRACT

Water-soluble polysaccharides, including cellulose ethers, containing pendent vicinal dihydroxy structure capable of cis geometry, which upon crosslinking with a polyvalent metal, have shear-thermal stability characteristics of at least about 30 at 250° F., are useful in oilfield applications.

48 Claims, No Drawings

POLYSACCHARIDES, METHODS FOR PREPARING SUCH POLYSACCHARIDES AND FLUIDS UTILIZING SUCH POLYSACCHARIDES

BACKGROUND OF THE INVENTION

1. Field of the Invention

This invention relates to novel polysaccharides and, more particularly, to water-soluble polysaccharides capable of use in various applications, including oil field applications such as hydraulic fracturing fluids, gravel packing, and the like.

2. Description of the Prior Art

Hydraulic fracturing fluids are widely used to stimulate production from oil and gas wells completed in low permeability formations. The fracturing fluid is pumped at a rate sufficient to open a fracture in the exposed formation and to extend the fracture from the well bore into the formation. Continued pumping of the fracturing fluid containing a proppant such as sand into the fracture results in proppant placement within the fractured zone. Following this treatment, the resulting fracturing fluid is recovered from the well, leaving the proppant remaining in the fracture, thereby preventing the complete closure and forming a permeable channel extending from the well bore into the formation.

The conductivity of the propped fracture depends in part on the size of the propped particles placed in the fracture. Such conductivity, in turn, depends upon the width to which the particular fracture may be opened during injection of the fracturing fluid. This will normally require that the hydraulic fracturing fluid employed have a relatively high viscosity.

The use of a high viscosity fracturing fluid is advantageous. Such fluids can support propped particles suspended therein without excessive settling. Also, relatively large propped particles can be placed in the formation using high viscosity fracturing fluids since wider fractures generally result, reducing the possibility of proppant particles bridging across the mouth of the fracture and accumulating in the well bore, a condition sometimes referred to as "screen-out".

However, the use of high viscosity fracturing fluids is disadvantageous due to excessive friction losses often encountered during the injection of such fluids into the formation through the tubing or casing disposed in the well bore. Thus, the pumping equipment and tubular goods available at the wellhead are often limited, and the wellhead pressure and the hydraulic horsepower required to overcome such friction losses are often prohibitive.

In addition, the fracturing fluids are exposed to high shear conditions while being pumped down the well bore. Suitable fracturing fluids must accordingly be capable of undergoing such high shear without involving any undue loss in stability, to minimize or eliminate problems, such as screen-out.

Still further, as the fracturing fluid extends out of the well bore into the fracture, the temperatures encountered substantially increase. It is accordingly necessary for fracturing fluids to be useful at such elevated temperatures, desirably up to 200° to 350° F. or more. While techniques are known to decrease the high temperatures involved (e.g., initially using sacrificial fluid to cool the formation) or the effects thereof (e.g., the use of auxiliary thermal stabilizers), the hydraulic fracturing fluid still must adequately perform at elevated temperatures. Thus, undue thermal instability at such elevated temperatures will cause problems such as fluid loss into the formation as well as the inability to carry sand into the formation, both of which translate into decreased productivity.

Lastly, after the proppant is in place in the fracture, the fracturing fluid must be capable of being readily removed so that oil or gas production can commence. In this regard, the fracturing fluid must be capable of being removed without any significant amount of residue remaining in the fractured formation which would decrease the permeability thereof, thereby decreasing productivity.

These diverse and demanding criteria have engendered substantial effort to provide a satisfactory fracturing fluid. Over the years numerous solutions have been proposed.

One general approach which has resulted in extensive efforts involves the use of a fracturing fluid containing a polymer and a cross-linking agent for the polymer. In theory, such a fracturing fluid can provide viscosity adequate to carry the proppant down the tubing into the fracture and will then provide a very high viscosity due to the cross-linked system that is formed in situ. The fracturing fluid may then be removed by either the action of a delayed action breaking agent which is included in the fracturing fluid or by the elevated temperatures which the hydraulic fluid encounters in the fractured formation.

U.S. Pat. No. 3,058,909 (Kern) discloses aqueous fluids having improved solids-suspending properties and improved fluid-loss characteristics for use in treating subsurface earth formations which incorporate in an aqueous medium a complex of a polyorganic compound having at least one reactive unit consisting of two adjacent hydroxyl groups arranged in a cis configuration and a boron compound capable of supplying borate ions in the aqueous solution. High molecular weight carbohydrates are most desirable, particular materials disclosed including guar and locust bean gum. The necessity of employing polyorganic compounds having at least one reactive group consisting of two adjacent hydroxyl groups arranged in a cis configuration to form the complex is illustrated by comparing materials of this nature with other carbohydrates whose chemical structure are quite similar except for the absence of the cis configuration.

U.S. Pat. No. 3,163,219 (Wyant et al.) sets forth a self-breaking, borate-gum, water-base gel utilized in oil, gas and water wells. Such gels are prepared by reacting an organic compound having at least one reactive unit consisting of two adjacent hydroxyl groups arranged in a cis configuration with a boron compound capable of supplying borate ions in an aqueous solution. The composition also includes a delayed action, gel-breaker such as solid calcium sulfate and the like.

U.S. Pat. No. 3,215,634 (Walker) relates to a method for reducing the temperature sensitivity of polymer solutions containing borate ion, cross-linking agents. The use of a polyhydric alcohol and a crosslinking agent which yields borate ions in solution stabilizes such solutions and reduces their sensitivity to temperature. The water-soluble polymers utilized are high molecular weight polysaccharides having adjacent cis hydroxyl groups attached to one or more of the monosaccharide units in the polymer structure. Preferred polysaccharides include the galactomannans.

U.S. Pat. No. 3,696,035 (Nimerick) discloses fracturing compositions which include a periodic acid and/or a water soluble salt thereof in an aqueous-alcohol mixture which has been thickened with a cellulose derivative. The thickened mixture reverses to a relatively flowable fluid after a period of time. Cellulose derivatives having the degree of substitution (D.S.) providing solubility in aqueous or aqueous-alcohol mixtures and which provide a viscous system having a minimum viscosity of about 10 centipoises when 0.25% by weight of the cellulose is dissolved in an aqueous or aqueous-alcohol mixture at a temperature of 80° F. are suitable. Numerous cellulose derivatives which may be employed as a thickening agent are described, including cellulose ether, ethyl hydroxyethylcellulose, ethyl methylcellulose, hydroxyethyl cellulose and the like.

U.S. Pat. No. 3,727,688 (Clampitt) relates to a fracturing fluid comprising an aqueous gel, the gel including a water-thickening amount of a water-soluble cellulose ether and a water-soluble compound of a polyvalent metal wherein the metal is capable of being reduced to a lower polyvalent valence state and which is sufficient to gel the water when the valence of at least a portion of the metal is reduced to such lower valence state. Suitable cellulose ethers include carboxyalkylcellulose, mixed ethers such as carboxyalkyl hydroxyalkyl ethers, hydroxyalkylcellulose and the like.

U.S. Pat. No. 3,741,894 (Storfer) states that certain long chain water-soluble or water-dispersible organic polymers that are not normally susceptible of cross-linking with trivalent chromium and similar polyvalent cations can be chemically modified to permit such cross-linking to form modified polymers useful in the preparation of oil field drilling fluids and similar compositions. Thus, water-dispersible organic polymers having hydroxyl groups located in $\beta$ positions with respect to one another can be reacted in an aqueous solution with $\alpha$-keto carboxylic acids containing from about 2 to about 6 carbon atoms per molecule to form cyclic ketals. The reaction products possess the essential characteristics of the unmodified polymers but undergo cross-linking reactions with trivalent chromium and other polyvalent cations in an aqueous solution, apparently through an olation mechanism.

U.S. Pat. Nos. 3,768,566 and 3,898,165 (Ely et al.) disclose a method for increasing the viscosity of the fluid at a time when the fluid is being subjected to temperatures which tend to reduce the initial viscosity. The viscosity is increased by the hydration of an additive which is a polysaccharide that has been cross-linked such that the hydration rate of the polysaccharide is greatly retarded at temperatures below about 100° F. However, the bonds between the cross-linking agent and the polysaccharide are temperature sensitive, breaking at temperatures above about 140° F., thereby enabling the aqueous fluid to hydrate the polysaccharide. Useful cross-linking agents are certain dialdehydes. Useful polysaccharides are those having a molecular weight of at least about 100,000 including galactomannan gums and cellulose derivatives including carboxymethylcellulose, carboxymethylhydroxyethylcellulose, and hydroxyethyl cellulose. The preferred gelling agent is hydroxyethylcellulose having an ethylene oxide substitution within the range of about 1 to about 10 moles of ethylene oxide per anhydroglucose unit.

U.S. Pat. No. 3,848,673 (Clampitt et al.) and U.S. Pat. No. 3,978,928 (Clampitt) disclose a method of treating a subterranean formation which includes the use of a fluid medium comprising an aqueous gel having a water-soluble cellulose ether, a water-soluble compound of a polyvalent metal wherein the metal is capable of being reduced to a lower polyvalent valence state and a reducing agent. A variety of cellulose ethers are set forth as being suitable.

U.S. Pat. No. 3,888,312 (Tiner et al.) describes a fracturing fluid including an aqueous liquid, a gelling agent and a cross-linking compound, which fluid has a viscosity while in laminar flow of 25 centipoises and greater up to about 100,000 centipoises, but which, while in turbulent flow, such as in a conduit, exhibits a resistance to fluid flow of less than that of water. The gelling agents useful are various solvatable polysaccharides having a molecular weight of at least about 100,000 including galactomannan gums and cellulose derivatives, and hydroxyethylcellulose derivatives having between 0.5 and about 10 moles of ethylene oxide per anhydroglucose unit. A suitable crosslinking compound includes the presence of titanium in the +4 oxidation state. U.S. Pat. No. 4,033,415 (Holtmyer et al.) discloses a similar aqueous gel for fracturing and placing propping agents within a subterranean formation, and numerous cross-linking agents are disclosed.

U.S. Pat. No. 4,144,179 (Chatterji) discloses a composition for treating low temperature subterranean formations comprising a gelled aqueous composition which includes an aqueous liquid, a water soluble organic gelling agent, a free radical generating agent, and a reducing agent. Water soluble organic gelling agents disclosed include water soluble derivatives of cellulose, including hydroxyethyl cellulose, carboxymethylhydroxyethylcellulose, carboxymethylcellulose, and the like.

U.S. Pat. No. 4,323,123 (Swanson) describes gelled compositions suitable as fracture fluids and the like which comprise water, a polymeric viscosifier, an aldehyde component and at least one phenolic component such as resorcinol. Any of the water-soluble cellulose ethers may be used to prepare the aqueous gels.

U.S. Defensive Publication No. T103,401 (Majewicz) discloses that, if carboxymethyl cellulose is modified with hydroxyethyl functionality, the salt sensitivity of the aqueous solutions thereof is improved to the point where use as a thickener for fracturing fluids is provided. Carboxymethylhydroxyethylcellulose having a carboxymethyl degree of substitution of 0.7 to 1 and a hydroxyethyl molecular substitution of 0.3 to 2 can be so employed. Cross-linking of the cellulose derivatives employed may be effected by means of trivalent and tetravalent metal ions, including aluminum, titanium and chromium.

Despite this considerable effort, state-of-the-art fracturing fluids utilize, as the water soluble polymer, guar gum or guar gum derivatives, such as hydroxypropyl guar gum. Guar gum has the capability of being cross-linked by a variety of polyvalent metals, including chromium, titanium, boron and zirconium. In comparison to other polymer systems utilized, it is generally considered that "gelled" fracturing fluids utilizing guar gum and the like develop not only adequate viscosity to provide support for proppants but, while not entirely satisfactory, at least provide improved performance upon being exposed to high rates of shear and elevated temperatures in comparison to such other polymer systems. However, and unfortunately, guar and guar derivatives contain substantial amounts of insoluble matter, typically amounting from about 5% up to about 10% or more by weight; and it has been postulated that degradation may provide additional quantities of insoluble matter. It is widely accepted that the presence of such insoluble matter results in formation damage, viz.—a reduction in the productivity that would otherwise be obtained. The supply and availability of guar gum also involves some uncertainty.

Cellulose ethers such as hydroxyethyl cellulose would on the surface appear to be excellent alternatives to guar and guar derivatives for use in fracturing fluids. Thus, hydroxyethyl cellulose should be capable of being degraded without any undue residue that would cause formation damage. It is also believed that hydroxyethyl cellulose itself should inherently possess greater thermal stability, or may be stabilized by additives to provide such greater thermal stability, than guar gum and the like.

Despite this theoretical potential hydroxyethyl cellulose or its derivatives have not been utilized in fracturing fluids to any substantial extent, at least in the more demanding applications. Prior attempts using hydroxyethyl cellulose have thus been unable to provide fracturing fluids with shear-thermal stability characteristics which in service provide characteristics considered comparable to those achieved through the use of guar gum and the like. Hydroxyethyl cellulose and its derivatives have heretofore been unable to be adequately crosslinked to provide the characteristics generally desired for useful fracturing fluids, particularly in high temperature applications. Accordingly, despite the accepted view that the use of guar gum and the like results in formation damage, such materials continue to be the materials of choice for use in hydraulic fracturing fluids, especially in the more demanding applications.

U.S. Pat. No. 4,001,210 (Engelskirchen et al.) discloses a process for manufacturing cellulose containing 2,3-dihydroxypropyl ether groups. Neutralization with a source of borate ions such as boric acid provides substantially increased viscosity of such cellulose derivatives in an aqueous solution in comparison to the use of, for example, hydrochloric acid. The etherification reaction may be carried out with glycidol or a derivative which reacts like glycidol under the reaction conditions. Suitable examples of these derivatives include its easily saponifiable derivatives, such as the lower alkanoic acid esters of glycidol, glycidol acetate being exemplified. Suitable suspending agents for the reaction include secondary lower alkanols such as isopropanol, tertiary alcohols, ketones such as 2-butanone, and cyclic oxaalkanes and dioxaalkanes.

U.S. Pat. No. 4,013,821 (Engelskirchen et al.) has as an object to provide a process for preparing cellulose ethers which can be easily washed out in the presence of borate ions and a solution of which is distinguished by an especially high viscosity. Cellulose ethers which contain one or several alkyl, hydroxyalkyl, or carboxyalkyl substituents and a total degree of substitution of 0.05–4.0 are converted into the corresponding 2,3-dihydroxypropyl mixed ethers by reaction with glycidol and/or a glycerol monohalohydrin such as 1-halo-2,3-dihydroxypropane. The use of glycidol is preferred since the glycerol monohalohydrin contains dihalo compounds that are only very difficultly separable and result in cross-linking reactions taking place.

U.S. Pat. No. 4,096,326 (Reid) discloses the reaction product of 3-chloro-1,2-propanediol or glycidol and cellulose ethers to provide ethers that are water-soluble. The resulting product forms useful complexes with certain borate and antimonate compounds which are highly stable in brine. Desired products are achieved over a fairly wide range of the dihydroxypropyl substituent levels, ranging from about 1.4 up to 6 dihydroxypropyl groups per anhydroglucose unit.

Yet, despite all of this prior technology and effort, there remains the need for a water-soluble polymer capable of use in hydraulic fracturing fluids and the like which will provide in service shear-thermal stability characteristics at least substantially equivalent to those achieved through use of guar gum and the like without the attendant potential for formation damage.

OBJECTS OF THE INVENTION

It is accordingly an object of the present invention to provide polysaccharides which are water soluble and are characterized, upon cross-linking, by satisfactory shear-thermal stability characteristics.

A further and related object provides polysaccharides capable of use in hydraulic fracturing fluids which minimize or eliminate formation damage.

A still further object is to provide polysaccharides possessing properties useful for oilfield applications such as gravel packing and the like.

Yet another object of this invention provides a facile synthesis for preparing such polysaccharides.

Other objects of the present invention will be apparent from the description set forth hereinafter.

SUMMARY OF THE INVENTION

The present invention is based on the discovery that novel water-soluble polysaccharides which are useful in applications such as hydraulic fracturing fluids may be provided by incorporation of a pendent vicinal (hereinafter "vic") dihydroxy structure assuming, or capable of assuming, a cis geometry in the hydroxyethyl cellulose or other cellulose ether utilized under carefully selected conditions. The resulting polysaccharides have the capability of being cross-linked by polyvalent metals, such as titanium and the like, which should provide, in service as hydraulic fracturing fluids and the like, shear-thermal stability characteristics at least essentially equivalent to that achieved through use of guar gum and its derivatives without resulting in any significant formation damage.

DETAILED DESCRIPTION OF THE INVENTION

Starting Materials

Hydroxyethyl cellulose products are known and may be utilized. It is preferred to use such products having the highest molecular weight available to achieve the optimum performance characteristics. It has thus been found suitable to utilize hydroxyethyl celluloses having molecular weights such that a 1% by weight solution of the polysaccharide in water will have a Brookfield viscosity (#4 Spindle/30 rpm) at 20° C. of at least about 2,500, more desirably at least about 5,000 centipoises. Hydroxyethyl celluloses of lower molecular weights may be utilized so long as the requisite shear-thermal stability characteristics are provided.

The polysaccharide products of the present invention must be water soluble. As is known, hydroxyethyl celluloses having a molar substitution (MS) of about 1.5 to 3.5 or so will be water soluble. Regardless of whether the starting material itself is water soluble, it is satisfactory if the polysaccharide product resulting after incorporation of the pendent vic dihydroxy structure is water soluble.

Indeed, if desired, rather than the use of hydroxyethyl cellulose, the starting material could be those cellulosic sources, many of which are known, which are then converted to the desired cellulose ether by known techniques. To provide cellulose ethers with as high a molecular weight as possible, it is preferred in this regard to utilize as the cellulosic source, cotton linters. When this route is utilized, it should be unnecessary to isolate the purified hydroxyethyl cellulose by drying or the like. In other words, the resulting hydroxyethyl cellulose may be utilized in the diluent system in which it is prepared.

In addition, while the present invention will be principally described in conjunction with the use of hydroxyethyl cellulose as the cellulose ether from which the novel polysaccharides will be prepared, it should be appreciated that other cellulose ethers could be similarly employed. For example, hydroxypropyl cellulose, carboxymethylcellulose, alkyl celluloses such as methyl and ethyl cellulose, mixed ethers such as carboxyalkyl hydroxyalkyl ethers, e.g., carboxymethyl hydroxyethyl cellulose, and the like can be utilized under appropriate conditions.

Thus, any cellulose ether utilized should have the requisite molecular weight, be either water soluble or be capable of being rendered water soluble and be capable of being satisfactorily derivatized to incorporate the pendent vic dihydroxy structure. In conjunction with the latter requirement, when utilizing alkyl celluloses, carboxyalkyl celluloses and the like, the degree of substitution should not be so extensive that adequate incorporation of the pendent vic dihydroxy structure cannot be achieved. Also, with respect to the use of hydroxypropyl cellulose, the extent of propoxylation (i.e., —degree of substitution) should be controlled to avoid having a reactant with an unduly low cloud point which could interfere with the performance of the resulting product.

Indeed, the present invention should be applicable to use with any natural or synthetic polysaccharide which is either water soluble, or can be rendered water soluble as previously discussed herein, and meets the other criteria noted in conjunction with the cellulose ethers. When using natural polysaccharides, it is desirable that the material contain little or no insoluble matter. Obviously, the polysaccharide is a more likely candidate for use in the present invention if it does not already contain pendent vic dihydroxy structure which assumes or is capable of assuming cis geometry. Examples of natural polysaccharides which may perhaps be employed include dextran, carrageenan, schleroglucan, chitin, chitosan, and xanthan gum.

Pendent Vic Dihydroxy Incorporation

The hydroxyethyl cellulose material is chemically modified to incorporate pendent vic dihydroxy groups which assume or can assume cis geometry. This incorporation may be achieved by reaction of the hydroxyethyl cellulose with purified glycidol, as is commercially available.

Glycidol derivatives or compounds such as 3-chloro-1,2-propanediol(hereinafter "CPD"), which forms glycidol in situ, may likewise perhaps be utilized. The use of a high purity material is desirable to minimize the impurities which can interfere with the desired performance of the resulting product. In addition, other compounds which will provide a pendent vic dihydroxy structure, such as, for example, 2,3-epoxy-1, 4-butanediol, may also be utilized.

Similarly, what will be termed herein "crude glycidol" may be employed to incorporate the desired pendent vic dihydroxy structure. To this end, high purity CPD is dissolved in a suitable solvent, such as, for example, ethanol, isopropanol or t-butanol; and the temperature is adjusted to about 18° C. (±2° C.). Sodium hydroxide (50% by weight aqueous solution) is added over a period of about one hour or so with cooling to maintain the temperature at about 18° C. After the addition is complete, the reaction mixture is allowed to stand at ambient conditions for about 40 minutes or so. The reaction mixture is then filtered, and the resulting filtrate may be used without further processing to react with the hydroxyethyl cellulose to synthesize the polysaccharides of the present invention.

The crude glycidol should be used relatively promptly after preparation, e.g., within one or two days or so. Thus, relatively prompt use avoids a number of undesirable reactions which otherwise can take place which could result in hydrolysis of the glycidol, polymerization thereof, and the like. Storage of the crude glycidol at low temperatures can prolong the useful life somewhat.

It should be appreciated that the reaction conditions set forth herein to produce the crude glycidol are merely exemplary. What is considered important is that the synthesis take place in essentially an organic media, other than the water associated with the addition of the sodium hydroxide. This insures that the amount of water in the crude glycidol will not be so excessive as to require further processing to reduce the water level to that desired for reaction with the hydroxyethyl cellulose. It is also desirable to utilize a caustic level which will insure that essentially no sodium hydroxide will remain after completion of the reaction and to carry out the reaction at essentially ambient temperature conditions.

Still further, the pendent vic dihydroxy structure may be incorporated by use of an aromatic polyol wherein at least two hydroxyl groups are located on adjacent carbon atoms. This structure will be essentially equivalent to the vic dihydroxy structure on aliphatic alcohols which assumes, or can assume, cis geometry.

The incorporation of the pendent vic dihydroxy structure can be carried out by, in general, using the standard slurry techniques known for preparing cellulose ethers. However, care must be taken with the process parameters selected to insure that the resulting end product has the desired characteristics.

The basic procedure involved is summarized in the following series of equations:

 (1)

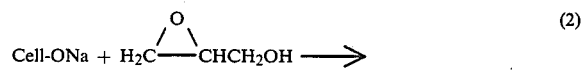 (2)

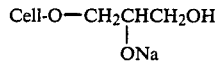

-continued

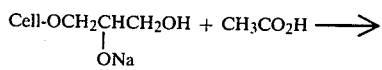 (3)

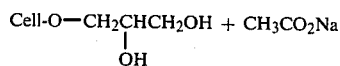

wherein "Cell" represents the cellulosic backbone.

A variety of diluents, such as, for example, alcohols, ketones and the like, and mixtures thereof are known for use in forming cellulose ethers. It is preferred to utilize acetone since polysaccharide products having improved performance characteristics have been provided. Isopropanol and t-butanol have also been found satisfactory.

The ratio of the diluent to the hydroxyethyl cellulose may be varied within wide limits. The product obtained does not appear to be particularly sensitive to the ratio employed. It has been found suitable to utilize weight ratios in the range of at least about 4:1 to about 25:1 or more, more desirably about 5:1 to about 10:1. The use of relatively high ratios (viz.—the amount of diluent to the amount of hydroxyethyl cellulose) tend to require longer reaction times to provide products with the requisite characteristics.

A wide variety of alkaline materials are known for use in preparing cellulose ethers and may be employed. It is preferred to utilize sodium hydroxide; however, other useful materials which may be used include, for example, potassium hydroxide and lithium hydroxide. The molar ratio of caustic/hydroxyethyl cellulose may suitably vary from about 0.4:1 or lower to 0.8:1 or so, more desirably about 0.5:1 to about 0.8:1. Based upon present data, it appears that products capable of imparting improved performance are obtained with lower caustic levels. The reaction of glycidol with hydroxyethyl cellulose is catalytic so that the sodium hydroxide or other caustic used is not consumed. The amount of caustic utilized must be adequate to causticize the hydroxyethyl cellulose, but increased amounts of caustic could result in increased nucleophilic attack of hydroxyl ions on glycidol, resulting in a lowering of the effective amount of glycidol available for reaction.

Cellulosics that are in contact with any base may be readily degraded by oxygen. It is accordingly necessary to exclude oxygen from the reaction vessel during the entire time in which caustic is present. It is suitable to carry out the reaction under a continuous flow of an inert gas such as nitrogen.

It is desirable to provide vigorous stirring so as to provide for more complete reaction and a more homogeneous product. Causticized cellulosics tend to be more gelatinous and viscous than normal cellulosics, and compensation for such should be kept in mind when selecting the stirring apparatus.

The reaction is carried out by adding glycidol over a period of time to a slurry of the hydroxyethyl cellulose in acetone or other diluent used which contains water and the caustic. The amount of water employed should be limited to the amount needed to swell the cellulose to allow the reaction to take place since increased amounts tend to provide products having less than optimum characteristics. When acetone is employed as a diluent, the amount of water may vary from about 5% to at least 20% or more, more desirably about 7% to about 13%, based upon the total weight of the water and acetone, a level of about 10% or so being preferred. When using isopropanol as a diluent, the range of water that may be used is significantly narrower, an amount of about 5% by weight water being desirable.

While addition all at once is acceptable, the glycidol is more desirably added over a period of time at the reaction temperature and then allowed to cook-out or react until completion. The conditions during the glycidol addition should be such as to minimize catenation. It is thus more desirable to add the glycidol slowly enough to achieve efficient mixing and to have a relatively homogeneous reaction mixture so as to minimize or eliminate localized areas of relatively high glycidol concentration. The reaction is desirably carried out at a temperature in the range from ambient conditions or so up to that of reflux conditions for the diluent system being employed. When carrying out the reaction under reflux conditions, it appears that the overall time of reaction involved is more important than the length of addition and completion, although it has been found desirable to provide an addition time of at least about one hour or so. It has been found satisfactory to use total reaction times of about 2 to about 5 hours or so under reflux conditions. The use of lower temperatures will require longer reaction times.

The amount of glycidol utilized should in a functional sense be sufficient to incorporate an adequate number of the pendent vic dihydroxy groups to provide, upon cross-linking, a polymer having the desired performance characteristics. Purified glycidol (e.g., distilled glycidol) is a relatively expensive component, and no substantial benefits are obtained by using excessive amounts. Weight ratios of glycidol/hydroxyethyl cellulose in the range of about 0.15:1 to about 0.7:1 should be suitable. A ratio of about 0.15 or so should provide a degree of substitution (DS) of about 0.3 while a ratio of 0.7:1 should provide a DS of about 1.3, assuming a 50% efficiency of incorporation of the glycidol. It has been found more desirable to utilize glycidol amounts adequate to provide a DS in the range of about 0.5 to about 1.2.

The efficiency can be estimated by mass balance, determined by weight gain of the product corrected for the salt formed from neutralizing the product, e.g.—sodium acetate when acetic acid is used.

In addition, the pendent vic dihydroxy content may be determined by a periodate oxidation as is known (*Quantitative Organic Analysis via Functional Groups*, Siggia and Hanna, Fourth Edition, 1979, John Wiley and Sons, pp. 42–43). The trans-1,2-diols in the glucose units of the cellulose backbone should not interfere with the titration of the pendent dihydroxy groups. Accordingly, unlike the theoretical and mass balance MS, which measure the total glycidol incorporation into the polymer, the titrated MS measures only the glycidol incorporated which still retains the vic dihydroxy structure. This technique thus discriminates between the glycidol incorporated internally in the pendent chain and the glycidol incorporated at the end of the pendent chain. The titrated MS therefore measures the number of available vic dihydroxy cross-linking sites per anhydrogluclose unit, and is more properly considered a measure of the degree of substitution (DS). The DS values set forth herein are accordingly determined by the periodate oxidation test.

The resulting product should be neutralized, as is known, to a slightly acidic pH to provide a product stable in air. Any of a variety of acids may be employed, as is known in conjunction with the preparation of cellulose ethers. The salts which result from the neutralization should be maintained at a minimum.

The polysaccharides which result may be washed and then dried to isolate the product as a powder. The particular conditions under which these steps are carried out are known. As an illustrative example, it is suitable to wash with an acetone/water mixture one or more times, followed by washing, one or more times with acetone. Drying may be accomplished in a vacuum at a temperature of, for example 50° C.

After washing, if it is desired to provide a product which has slower hydration characteristics, the polysaccharide may be treated with a dialdehyde such as glyoxal. Techniques of this type are known and may be used.

Cross-linkable Polysaccharide

The resulting product is a water soluble polysaccharide which is capable of being cross-linked by a polyvalent metal ion such as titanium to provide an extremely viscous product. Thus, a 1% by weight solution of the polysaccharides of this invention in water, uncorrected for salts and volatiles, will provide a Brookfield viscosity (30 rpm/#3 spindle) of at least about 1,200 or so, more typically about 1,800 to 3,500 or so, with polysaccharides having viscosities of at least about 2,500 or so being preferred. A 0.6% by weight solution of polymer in water, uncorrected for salts and volatiles, will provide a Fann viscosity (Fann Model 35 at 300 rpm) of at least about 40 centipoise or so, more typically about 45 to 55 centipoise.

The utilization of an optimum interrelationship of the process parameters discussed herein should provide a product which, in a water solution, appears clear to the eye.

Set forth below is an idealized cross-linking mechanism in which two of the pendent vic dihydroxy reaction sites which have assumed a cis geometry react with tetravalent titanium to form a tetravalent, hexacoordinate cross-link;

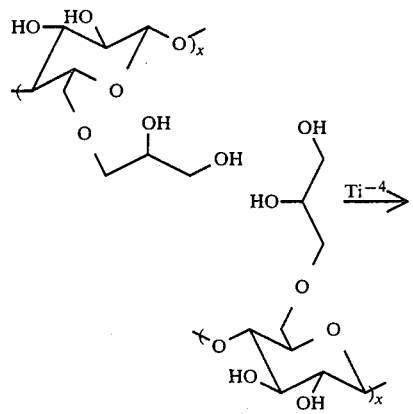

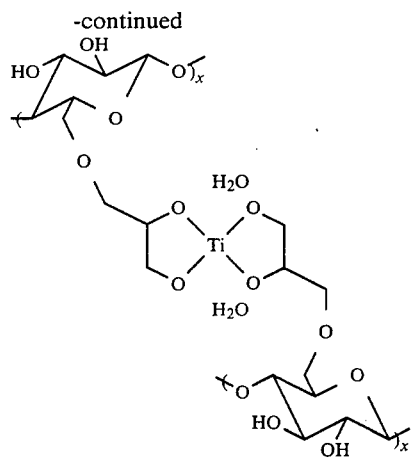

The actual mode of cross-linking is probably more complicated than the idealized illustration set forth.

Hydraulic Fracturing Fluids

The novel polysaccharides of the present invention are dissolved in water in an amount effective to provide adequate viscosity upon crosslinking to support the proppant particles being utilized at ambient conditions and to provide the desired shear-thermal stability characteristics. The amount can vary within wide limits, generally from about 0.2% to about 1.5% based upon the total weight of the fracturing fluid, more usually about 0.35% to about 1%.

If desired, a buffer may be included in the fracturing fluid to maintain the pH within a range of about 6 to about 9. Any buffer system which will maintain the pH of the fracturing fluid within this range is suitable so long as the buffer does not unduly interfere with the cross-linking reaction. As an example, a maleic acid-sodium hydroxide buffer may be employed.

The cross-linking agent is incorporated in the fracturing fluid in an amount sufficient to give the desired cross-linked viscosity. A wide variety of cross-linking agents are known and may be employed. Representative examples include cross-linkers based upon polyvalent elements such as tetravalent titanium, antimony, and zirconium and trivalent boron. It has been found that the use of boron cross-linking agents will generally not provide as desirable shear-thermal stability characteristics as may be achieved with certain of the transition metals, such as titanium. A variety of other cross-linking agents are known, as disclosed in *Chemical Model for the Rheological Behavior of Crosslinked Fluid Solutions*, M. W. Conway et al., Journal of Petroleum Chemistry, February, 1983, pages 315-320. Any of these cross-linking agents may also be employed so long as the desired shear-thermal stability characteristics are provided.

Suitable breaking agents are known in the art and may be employed. For example, various enzymes and oxidizers are known and may be employed.

With respect to the proppant, a variety of materials are known. Sand is often a material of choice. Additionally, other known proppants include walnut shell fragments, tempered glass beads, bauxite, aluminum pellets, and similar materials. Generally speaking, the proppants employed will have a particle size in the range of 8 to 40 mesh (U.S. Sieve Series); however, proppants with particle sizes outside this range can also certainly be employed.

In addition, so long as the particular materials employed do not adversely interfere with the crosslinking reaction, any of a variety of auxiliary agents used in conventional hydraulic fracturing fluids may be included. For example, friction reducers, biocides, surfactants, auxiliary thermal stabilizers, fluid loss agents, and the like are known in the art and may be employed.

Performance Characteristics

The shear-thermal stability characteristics are determined by a test procedure which is considered to simulate the conditions involved when the hydraulic fracturing fluid is pumped through the tubing, as well as the elevated temperatures downhole, viz.—as the hydraulic fluid enters the fracture. This procedure is, in general, described in several publications, including M. W. Conway and L. E. Harris, "A Laboratory and Field Evaluation of a Technique for Hydraulic Fracturing Stimulation of Deep Wells", SPE/0964, 57th Annual Conference and Exhibition of the Society of Petroleum Engineers of AIME, New Orleans, September, 1982.

Polymer solutions were prepared by adding the polysaccharide slowly with vigorous stirring to 2% by weight KCl in water. The stirring was continued for about 2 to 3 minutes, after which the solution was placed on a roll mill and rolled for about 3 to 5 hours. The pH of the solution was then adjusted to about 7.0.

The polymer solution (800 cc) was placed in the suction line of a Jabsco model 4720-0001 pump, the pump turned on, and the cross-linker solution injected into the suction line immediately. The cross-linker used was "TYZOR TE" triethanolamine titanate (E.I. duPont de Nemours). The cross-linker was diluted 50—50 (by weight) with water 30 minutes before use, and the resulting solution was added at a concentration of 2 gallon/1000 gallons of the polymer solution. The cross-linked fluid was then circulated for 4 minutes. The use of cross-linkers of this type is discussed in European Patent Application No. 104,927 (Hollenbeck et al.).

At the end of such circulation, 60 cc. of the cross-linked fluid was immediately withdrawn and placed in the cup of a Fann Model 50 viscometer, and the cup was then attached to the instrument. The cup rotation speed was brought to 300 r.p.m., the pressure adjusted to 100 p.s.i., and the temperature programmed to start heating from 80° F. to 250° F. at the maximum heating rate, all being done within about 30 seconds of withdrawing the cross-linked fluid from the Jabsco pump. The change in viscosity is displayed on a chart recorder, which is calibrated initially so that a 100 centipoise fluid gives a chart reading of 100 with a #1 bob at 300 rpm. Measured viscosity is plotted as the chart reading (considered to be proportional to viscosity) versus time in minutes. A #2 bob was used for measuring crosslinked polymer viscosity.

The pumping sequence through the Jabsco pump is considered to simulate the high shear conditions as the fracturing fluid is pumped into the tubing in the well bore. The initial Fann 50 reading at 80° F. is thus considered to provide an indication as to whether adequate viscosity is provided to support the proppant.

The exposure too the elevated temperatures is considered to simulate the conditions as the hydraulic fracturing fluid flows out into the fracture. The chart readings at 200° F. and 250° F. thus determine whether the cross-linked hydraulic fracturing fluid possesses adequate thermal stability to withstand the downhole conditions.

The novel polysaccharides of the present invention when crosslinked are characterized by shear-thermal stability characteristic defined as the above-mentioned viscosity measurements for a 0.6% aqueous solution of the crosslinked polysaccharide. Viscosity measurements using these chart readings are typically directly proportional to polysaccharide concentration in aqueous solution. At 80° F. the crosslinked polysaccharides of this invention provided readings of at least about 80, more typically at least about 100. The 250° F. chart readings achieved with the crosslinked polysaccharides of this invention are at least about 30, typically at least about 60, and more typically at least about 90 and up. The shear-thermal stability characteristics of the novel polysaccharides of the present invention when crosslinked are considered comparable to the performance exhibited upon using guar gum and its derivatives.

The reproducibility of the shear-thermal stability characteristic according to the test procedure will vary somewhat. Generally, values will be within about ±10 to 15%, ±20% on the outside.

It should be appreciated that the shear-thermal stability characteristics obtained will be dependent upon the cross-linking agent being utilized as well as upon the polymer concentration employed. The particular titanium cross-linking agent utilized in the subject testing protocol is not intended to be an optimized selection. The use of the cross-linking agent, however, provides an adequate determination of the performance of the polymer being tested.

The numerical values set forth herein, unless otherwise indicated, are based upon following the above test protocol with a polymer concentration of 0.6% by weight. This polymer level was selected since it is considered to represent an economically useful level for applications such as hydraulic fracturing fluids, gravel packs, and the like. In general, the shear-thermal stability characteristics provided will increase with increasing polymer levels.

In this field, the use of a static cross-linking test is often used to determine the effectiveness of a cross-linkable polysaccharide polymer or the like. It is reported that prior cross-linkable polymers (other than guar gum and its derivatives) typically provide viscosities in this test in the range of 100,000 to 150,000 centipoise. The performance of the polysaccharides of the present invention will typically achieve values greater than about 200,000 centipoise, values of 400,000 centipoise or so sometimes being obtained.

However, the static test is not considered to adequately differentiate between cross-linkable polymers which would have adequate utility in hydraulic fracturing fluids in high shear, high temperature applications and those which would not have satisfactory performance.

Other Applications

While the present invention has been described in conjunction with hydraulic fracturing fluids and particularly with respect to deep well, high temperature applications, it should be appreciated that the novel polysaccharides described herein will be likewise useful in hydraulic fracturing fluids for shallow wells also, as well as utilization in other oil field applications such as gravel packing and the like. Further, the polysaccharides of this invention may be employed in acid fracturing applications. In such applications, the acidizing solution will include the polysaccharide, water, a cross-linker and an acid. Suitable acids include hydrochloric, hydrofluoric, formic, acetic, and mixtures, thereof.

Indeed, the polysaccharides of the present invention may be employed in any application where the properties may prove desirable. An application requiring a viscosifier, such as, for example, a gellant for explosives would be a potential use. Other potential applications include use as an encapsulant, as for example, in time release applications, in coatings, and to immobilize enzymes/microorganisms.

It should also be appreciated that it may be desirable in some applications to utilize mixtures. This can be achieved by either employing a mixture of starting materials or by forming a mixture from the derivatized polysaccharides. Utilizing a mixture would allow achieving, for example, desirable ionic characteristics.

EXAMPLES

The following Examples are representative of the present invention, and not in limitation thereof. The materials used, and the general synthesis employed in the ensuing Examples were as follows:

MATERIALS USED

Hydroxyethyl Cellulose

A commercially available water-soluble HEC having a specified 1% solution Brookfield viscosity of 5,000 to 7,000 centipoise and a degree of substitution specified as 0.9 to 1.0 with a specified MS of about 2.

Diluents

Acetone: technical grade
Isopropanol: technical grade
Tetrahydrofuran: technical grade
t-butanol: technical grade
Methyl ethyl ketone: technical grade
2-butoxyethanol: technical grade
Glycidol: Technical grade (Aldrich Chemical Company), further purified by distillation at 50° C./15 torr.
Sodium Hydroxide: 50% by weight aqueous sodium hydroxide
Potassium Hydroxide: 47% by weight aqueous potassium hydroxide.
Lithium Hydroxide: 6.7% by weight aqueous lithium hydroxide.
Water: deionized water
Nitrogen: prepurified

General Synthesis

A one liter resin kettle was charged with HEC and the diluent system utilized. The kettle was fitted with a stirring paddle and motor, a reflux condenser and mineral oil bubbler, nitrogen inlet, a serum cap, and a pressure-equalizing addition funnel. The slurry was stirred for one hour while sparging the apparatus with nitrogen to remove all entrained air.

An aqueous solution of sodium hydroxide solution was added to the stirred slurry through the serum cap using a 10 ml. syringe. The caustic was added dropwise over 10 minutes while maintaining the temperature typically at 25° C. The slurry was stirred for one hour and heated to reflux. A solution of glycidol in the diluent was added to the refluxing slurry over a period of time. After the glycidol addition was complete, the mixture was refluxed for an additional time.

The slurry was cooled, and an excess of glacial acetic acid was added dropwise over 10 minutes. The slurry was stirred for an additional 10 minutes, and the polysaccharide was collected by vacuum filtration. The polysaccharide was then washed in a Waring blender using the following procedure: six times with 500 ml. of 4:1 (by volume) acetone/water and three times with 500 ml. of pure acetone. The polysaccharide was then dried in vacuo at 50° C./20 torr. to provide the product.

EXAMPLES 1-5

These Examples illustrate the effect of the particular diluent employed on the shear-thermal stability characteristics of the synthesized polysaccharide.

Polysaccharides were prepared using the general synthesis and the following parameters: a diluent system including 10% by weight water, a diluent/HEC ratio of 16.7, a caustic/HEC ratio of 0.7, glycidol addition over one hour to provide a DS of 0.8, and a total reaction time of 2 hours.

The shear-thermal stability characteristics were determined, and the results are set forth in Table I:

TABLE I

| Ex. | Diluent | Polymer Concentration, wt. % | Shear-Thermal Stability | | |
|---|---|---|---|---|---|
| | | | 80° F. | 200° F. | 250° F. |
| 1 | t-butanol | 0.8 | 145 | 190 | 140 |
| 2 | acetone | 0.8 | 200 | 192 | 170 |
| 3 | 2-butoxyethanol | 0.75 | 125 | 32 | 19 |
| 4 | tetrahydrofuran | 0.75 | 140 | 46 | 25 |
| 5 | isopropanol | 0.75 | 160 | 62 | 47 |

As can be seen, the polysaccharides synthesized using t-butanol, acetone and isopropanol should provide products which when crosslinked have shear-thermal stability characteristics within the present invention.

EXAMPLES 6-11

These Examples illustrate the effect of water concentration when using acetone as a diluent on the shear-thermal stability characteristics of the resulting polysaccharides.

Polysaccharides were prepared using the general synthesis and the following parameters: a diluent/HEC ratio of 6.7, a caustic/HEC ratio of 0.7, glycidol addition over 2 hours to provide a DS of 0.8, and a total reaction time of 3 hours.

The shear-thermal stability characteristics were determined using a crosslinked polymer concentration of 0.6% by weight, and the results are set forth in Table II:

TABLE II

| Example | Water Content, Wt. % | Shear-Thermal Stability | | |
|---|---|---|---|---|
| | | 80° F. | 200° F. | 250° F. |
| 6 | 20 | 128 | 108 | 76 |
| 7 | 15 | 120 | 105 | 71 |
| 8 | 12.5 | 140 | 132 | 110 |
| 9 | 10 | 123 | 164 | 106 |
| 10 | 7.5 | 140 | 152 | 104 |
| 11 | 5.0 | 122 | 83 | 58 |

The results indicate that all water levels provided products which when crosslinked have shear-thermal stability characteristics within the present invention.

However, water levels within the range of about 7 to 13 weight percent provided more desirable shear-thermal stability characteristics.

EXAMPLES 12–19

These Examples illustrate the effect of varying the diluent/HEC ratio on the shear-thermal stability characteristics of the resulting crosslinked polysaccharides.

Polysaccharides were prepared using the general synthesis and the following parameters: a diluent comprising acetone and 10% by weight water, a caustic/HEC ratio of 0.7, glycidol addition over one hour to provide a DS of 0.8, and a total reaction time of two hours.

The shear-thermal stability characteristics were determined using a crosslinked polymer concentration of 0.8% by weight for Examples 12–18 and 0.75% by weight for Example 19, and the results are set forth in Table III:

TABLE III

| Example | Diluent/HEC Ratio | Shear-Thermal Stability 80° F. | 200° F. | 250° F. |
|---|---|---|---|---|
| 12 | 4 | 200 | 164 | 134 |
| 13 | 5 | 200 | 210 | 150 |
| 14 | 6.7 | 200 | 192 | 170 |
| 15 | 10 | 180 | 55 | 38 |
| 16 | 16.7 | 200 | 170 | 160 |
| 17 | 16.7 | 212 | 175 | 120 |
| 18 | 20 | 184 | 150 | 80 |
| 19 | 25 | 150 | 70 | 54 |

The use of all diluent/HEC ratios employed provided products which when crosslinked should have shear-thermal stability characteristics within the present invention. The shear-thermal stability characteristics exhibited by the product of Example 15 when crosslinked is believed to be a spurious result, and it is further believed that the result should be similar to that determined for the products of Examples 14 and 16.

EXAMPLES 20–26

These Examples illustrate the effect of varying the DS of the polysaccharides.

Polysaccharides were prepared using the general synthesis and the following parameters: a diluent comprising acetone and 10% by weight water, a diluent/HEC ratio of 6.7, a caustic/HEC ratio of 0.7, glycidol addition over two hours, and a total reaction time of three hours.

The shear-thermal stability characteristics were determined using a crosslinked polymer concentration of 0.6% by weight, and the results are set forth in Table IV:

TABLE IV

| Example | DS | Shear-Thermal Stability 80° F. | 200° F. | 250° F. |
|---|---|---|---|---|
| 20 | 0.6 | 124 | 106 | 75 |
| 21 | 0.7 | 134 | 148 | 98 |
| 22 | 0.8 | 123 | 164 | 106 |
| 23 | 1.0 | 140 | 125 | 120 |
| 24 | 1.25 | 146 | 212 | 152 |
| 25 | 1.6 | 130 | 174 | 108 |
| 26 | 2.0 | 146 | 96 | 56 |

The use of all DS levels provided products which when crosslinked have shear-thermal stability characteristics within the present invention.

EXAMPLES 27–36

These Examples illustrate the effect of varying the caustic/HEC ratio on the shear-thermal stability characteristics of the resulting polysaccharides.

Polysaccharides were prepared using the general synthesis and the following parameters: a diluent comprising acetone and 10% by weight water, a diluent/HEC ratio of 6.7, glycidol addition over a period of two hours to provide a DS of 0.8, and a total reaction time of three hours.

The shear-thermal stability characteristics were determined using a crosslinked polymer concentration of 0.6% by weight, and the results are set forth in Table V:

TABLE V

| Example | Caustic/HEC Ratio | Shear-thermal Stability 80° F. | 200° F. | 250° F. |
|---|---|---|---|---|
| 27 | 0.18 | 120 | 46 | 29 |
| 28 | 0.30 | 130 | 59 | 38 |
| 29 | 0.42 | 130 | 124 | 102 |
| 30 | 0.48 | 132 | 144 | 96 |
| 31 | 0.53 | 132 | 184 | 128 |
| 32 | 0.59 | 126 | 184 | 120 |
| 33 | 0.65 | 136 | 164 | 118 |
| 34 | 0.71 | 123 | 164 | 106 |
| 35 | 0.83 | 130 | 174 | 115 |
| 36 | 0.96 | 128 | 185 | 117 |

The use of all caustic/HEC ratios provided products which when crosslinked have shear-thermal stability characteristics within the present invention. Based upon these results, no significant benefits are obtained by using a caustic/HEC ratio in excess of about 0.6:1.

EXAMPLES 37–44

These Examples illustrate the effect of varying the glycidol addition time and the reaction time on the shear-thermal stability characteristics of the resulting polysaccharides.

Polysaccharides were prepared using the general synthesis and the following parameters: a diluent comprising acetone and 10% by weight water, a diluent/HEC ratio of 6.7, a caustic/HEC ratio of 0.7, and glycidol in an amount to provide a DS of 0.8.

The shear-thermal stability characteristics were determined using a crosslinked polymer concentration of 0.8% by weight, and the results are set forth in Table VI:

TABLE VI

| Example | Addition Time, Hrs. | Total Reaction Time, Hrs. | Shear-Thermal Stability 80° F. | 200° F. | 250° F. |
|---|---|---|---|---|---|
| 37 | 2 | 3 | 200 | 292 | 236 |
| 38 | 4 | 5 | 220 | 236 | 160 |
| 39 | 1 | 3 | 200 | 300 | 216 |
| 40 | 1 | 3 | 200 | 290 | 220 |
| 41 | 1 | 4 | 180 | 220 | 150 |
| 42 | 1 | 2 | 205 | 300 | 250 |
| 43 | 1 | 2 | 192 | 248 | 176 |
| 44 | 1 | 2 | 200 | 192 | 170 |

The use of all addition and total reaction times should provide products which when crosslinked have shear-thermal stability characteristics within the present invention. Based upon these results, a glycidol addition time in excess of one hour does not provide significant benefits.

EXAMPLE 45

This Example illustrates the effect of the use of a breaking agent to degrade a hydraulic fracturing fluid utilizing a polysaccharide of the present invention and compares the results achieved with a fracturing fluid using hydroxypropyl guar to assess the potential formation damage that might result.

A 0.55% by weight solution in water of the polysaccharide of Example 22 was buffered to a pH of about 7 by addition of 2 grams of maleic acid and 4.7 cc. of 6M NaOH. One gram of ammonium persulfate was added as a breaking agent.

The resulting solution was mixed in a blender at a speed sufficient to form a vortex near the bottom of the blender jar but not so fast that air bubbles were mixed into the fluid. "TYZOR TE" triethanolamine titanate cross-linker (E. I. duPont de Nemours) was then added to said solution at a rate of one gallon per 1000 gallons of said solution. The mixture was stirred until a gel was formed with a viscosity such that the top layer of the fluid became stationary.

The resulting gel was then allowed to stand overnight at room temperature. After this time, the viscosity had decreased to ten centipoise (Brookfield—#2 spindle/60 r.p.m.); and the solution was completely clear with no visible precipitates.

The above procedure was repeated except that the ammonium persulfate breaker was replaced with 10 ml. of a commercially available enzyme breaker, cellulase (Breakerase C, GB Fermentation Industries, Inc.). Again, upon standing overnight, the solution viscosity had decreased to ten centipoise; and there was no visible precipitate.

The above procedure was again repeated using, for purposes of comparison, hydroxypropyl guar at a concentration of 0.5% by weight and 0.5 gallons of the titanium cross-linker per 1000 gallons. One experiment utilized ammonium persulfate as a breaker and the other utilized guarase (Breakerase G, GB Fermentation Industries, Inc.). In the first case, a significant quantity of precipitate was observed while in the latter the solution was observed to contain a significant quantity of insoluble material suspended throughout.

It would be expected that the amount of insoluble material resulting from the use of hydroxypropyl guar would cause some formation damage in contrast to use of the polysaccharides of the present invention.

EXAMPLES 46-47

These Examples illustrate the effect of using "crude" glycidol on the shear-thermal stability characteristics of the resulting polysaccharides.

Polysaccharides were prepared using the general synthesis and the following parameters: in Example 46 a diluent comprising acetone and 10% by weight water, and in Example 47, a diluent comprising acetone and 7.5% by weight water; a diluent/HEC ratio of 6.7, a caustic/HEC ratio of 0.7, "crude" glycidol addition over a period of two hours to provide an DS of 0.85, and a total reaction time of 3 hours. The composition of the "crude" glycidol used was determined using gas chromatography. The preparation of the "crude" glycidol employed the synthesis parameters previously described.

The shear-thermal stability characteristics were determined, and the results are set forth in Table VII:

TABLE VII

| Example | Crude Glycidol Analysis | | | | Shear-Thermal Stability | | |
|---|---|---|---|---|---|---|---|
| | Isopropanol | Water | Glycidol | CPD | 80° F. | 200° F. | 250° F. |
| 46 | 43.8% | 18.3% | 24.5% | 0.75% | 150 | 112 | 78 |
| 47 | 44.6% | 19.0% | 26.7% | 0.7% | 125 | 184 | 130 |

As can be seen, the use of "crude" glycidol provided products which when crosslinked have shear-thermal characteristics within the present invention.

EXAMPLE 48

This Example illustrates the effect of using 2,3-epoxy-1,4-butanediol on the shear-thermal stability characteristics of the resulting polysaccharides. The preparation of 2,3-epoxy-1,4-butanediol is disclosed in U.S. Pat. No. 2,870,171 (Gable).

A polysaccharide was prepared using the general synthesis and the following parameters: a diluent comprising acetone and 7.5% by weight water, a diluent/HEC ratio of 6.8, a caustic/HEC ratio of 0.6, an epoxide addition time of 2 hours and total reaction time of 5 hours, and 2,3-epoxy-1,4-butanediol in an amount to provide a DS of 0.5.

The shear-thermal stability characteristics of the crosslinked product were determined; and the results at 80°, 200°, and 250° F. were 180, 120, and 132, respectively.

EXAMPLE 49

This Example illustrates the effect of using 3-chloro-1,2-propanediol (CPD) on the shear-thermal stability characteristics of the resulting polysaccharides.

A pure laboratory sample of CPD was prepared from the reaction of distilled glycidol with a stoichiometric amount of hydrogen chloride in diethyl ether at 0° C., followed by distillation at 66°70° C./0.01 torr. A polysaccharide was prepared using the general synthesis and the following parameters: a diluent comprising isopropanol and 5% by weight water, a diluent/HEC ratio of 6.7, a caustic/HEC ratio of 0.7, CPD addition over 2 hours with a simultaneous addition of a stoichiometric amount of sodium hydroxide to afford a DS of 0.9, and a total reaction time of 3 hours.

The shear-thermal stability characteristics of the crosslinked product were determined; and the results at 80°, 200°, and 250° F. were 120, 96, and 80, respectively.

EXAMPLE 50

This Example illustrates the effect of using potassium hydroxide on the shear-thermal stability characteristics of the resulting polysaccharides.

A polysaccharide was prepared using the general synthesis and the following parameters: a diluent comprising acetone and 10% by weight water, a diluent/HEC ratio of 6.7, a caustic/HEC ratio of 0.6, glycidol addition over 2 hours to provide a DS of 0.9, and a total reaction time of 3 hours.

The shear-thermal stability characteristics of the crosslinked product were determined; and the results at 80°, 200° and 250° F. were 140, 93, and 85, respectively.

EXAMPLE 51

This Example illustrates the effect of using lithium hydroxide on the shear-thermal stability characteristics of the resulting polysaccharides.

A polysaccharide was prepared using the general synthesis and the following parameters: a diluent comprising acetone, a diluent/HEC ratio of 6.7, a caustic/HEC ratio of 0.7, glycidol addition over two hours to provide a DS of 0.8, and a total reaction time of three hours. Lithium hydroxide reacts rapidly with carbon dioxide, so carbon dioxide must be excluded from the reaction; and carbon dioxide-free water was used in the synthesis. The water in the reaction mixture was all added as lithium hydroxide solution.

The shear-thermal stability characteristics of the crosslinked product were determined; and the results at 80°, 200°, and 250° F. were 125, 120, and 88, respectively.

EXAMPLES 52–56

These Examples illustrate the effect of using cellulosics other than hydroxyethyl cellulose on the shear-thermal stability characteristics of the resulting polysaccharides.

Hydroxypropylhydroxyethylcellulose, used in Example 52 (HPHEC), was prepared with a propylene oxide MS of about 1.2, an ethylene oxide MS of about 2.0, and a 1% solution viscosity of 2500 cP (Brookfield LVT, 30 rpm, spindle #3). For Example 53, carboxymethylcellulose (CMC) with a carboxyl MS of 1.1 was prepared from cotton linters, according to the procedure in *Macromolecular Synthesis, Collected Volume* 1, J. S. Moore, ed., J. Wiley and Sons, New York, 1978, page 87. Hydroxypropyl cellulose (HPC), used in Example 54, was prepared from cotton linters with a propylene oxide MS of about 1.2.

Polysaccharides were prepared using the general synthesis and the following parameters: in Example 52, a diluent comprising isopropanol and 5% by weight water, and in Examples 53 and 54, a diluent comprising acetone and 10% by weight water; a diluent/cellulosic ratio of 6.7; in Example 52 a caustic/cellulosic ratio of 0.7, and in Examples 53 and 54 a caustic/cellulosic ratio of 0.6; in Example 52, a glycidol addition time of 4 hours with a total reaction time of 5 hours to give a glycidol DS of 0.9, and in Examples 53 and 54, a glycidol addition time of 2 hours with a total reaction time of 3 hours to give a glycidol DS of 0.7 and 0.9, respectively.

The shear-thermal stability characteristics of the crosslinked product were determined, and the results are set forth in Table VIII. The crosslinked polymer solution viscosities were determined as 1% aqueous solutions, using a Brookfield viscometer, model LVT, spindle #3 at 12 rpm.

TABLE VIII

| Example | Cellulosic Substrate | Glycidol DS | Solution Viscosity | Shear-Thermal Stability 80° F. | 200° F. | 250° F. |
|---|---|---|---|---|---|---|
| 52 | HPHEC | 0.9 | 2330 cP | 105 | 90 | 55 |
| 53 | CMC | 0.7 | 3200 cP | 102 | 57 | 45 |
| 54 | HPC | 0.9 | 3250 cP | 120 | 102 | 50 |

EXAMPLES 55–56

These Examples illustrate the use of other cross-linkers with the polysaccharides of the present invention.

In Example 55, a polysaccharide, prepared generally in accordance with the procedure of Example 22, was used as a blend having a DS of about 0.8 to 0.85. The shear-thermal stability test protocol was used, except that the polysaccharide solution was adjusted to a pH of 8 with maleic acid and sodium hydroxide, and a zirconium lactate solution (Machenzie Chemical Works, Inc.) was used as the cross-linker in an amount of 5 gallons per 1000 gallons of the polysaccharide solution.

In Example 56, a polysaccharide, prepared generally in accordance with the procedure of Example 46 and having a DS of about 0.97, was used. The shear-thermal stability test protocol was employed, except that the polysaccharide solution was adjusted to a pH of 7 with sodium hydroxide, and 3.3 gallons of cross-linker (a 15% methanolic solution of zirconium acetylacetonate) per 1000 gallons of the polysaccharide solution was employed.

The Fann 50 readings at 250° F. that were obtained for the crosslinked product were above 30.

We claim:

1. A water-soluble cellulose ether containing pendent vic dihydroxy structure having or capable of assuming a cis geometry and having a shear-thermal stability characteristic of at least about 30 at 250° F. for a 0.6 percent by weight aqueous solution of said cellulose ether crosslinked by a polyvalent metal ion.

2. The water-soluble cellulose ether of claim 1 wherein said cellulose ether has said shear-thermal stability characteristic of at least about 60.

3. The water-soluble cellulose ether of claim 2 wherein said cellulose ether has said shear-thermal stability characteristic of at least about 90.

4. The water-soluble cellulose ether of claim 1 wherein said pendent vic dihydroxy structure is present in an amount to provide a degree of substitution of from about 0.3 to about 1.3.

5. The water-soluble cellulose ether of claim 4 wherein the degree of substitution is in the range of from about 0.5 to about 1.2.

6. The water-soluble cellulose ether of claim 1 wherein said pendent vic dihydroxy structure comprises the residue of glycidol.

7. The water-soluble cellulose ether of claim 1 wherein said cellulose ether is a hydroxyethyl cellulose, a hydroxypropylhydroxyethyl cellulose, a carboxymethyl cellulose or a hydroxypropyl cellulose.

8. The water-soluble cellulose ether of claim 7 wherein said cellulose ether is hydroxyethyl cellulose.

9. The water-soluble hydroxyethyl cellulose of claim 8 wherein said cellulose ether has, as a 1 percent by weight solution in water, a Brookfield viscosity at 20° C. of at least about 1,200 centipoise.

10. The water-soluble hydroxyethyl cellulose of claim 9 wherein the Brookfield viscosity is at least about 1800.

11. The water-soluble hydroxyethyl cellulose of claim 9 wherein the Brookfield viscosity is at least about 2500.

12. A process for preparing a water-soluble cellulose ether containing pendent vic dihydroxy structure having or capable of assuming a cis geometry which comprises:

(a) charging a cellulose ether starting material to a diluent system including water in an amount sufficient to swell the cellulose ether starting material to provide a slurry in an enclosed reaction vessel, (b) stirring the slurry while sparging the reaction vessel with an inert gas to remove entrained air, (c) adding an alkaline material in an amount sufficient to catalyze the reaction of the cellulose ether with a reactant capable of incorporating into said cellulose ether a pendent vic dihydroxy structure, (d) adding said reactant over a predetermined period of time in an amount sufficient to incorporate in the cellulose ether a predetermined degree of substitution of pendent vic dihydroxy structure, (e) continuing stirring the slurry while allowing the reaction to be completed, the total reaction time being at least about 2 hours, the temperature being maintained throughout in the range of from about ambient conditions to reflux of the diluent system, (f) adding acid in an amount sufficient to neutralize the resulting water-soluble cellulose ether product and (g) recovering same, said cellulose ether having, upon cross-linking, a shear-thermal stability characteristic of at least about 30 at 250° F. for a 0.6 percent by weight aqueous solution of said cellulose ether crosslinked by a polyvalent metal ion.

13. The process of claim 12 wherein said cellulose ether is hydroxyethyl cellulose.

14. The process of claim 13 wherein said hydroxyethyl cellulose starting material has, as a 1 percent by weight solution in water, a Brookfield viscosity at 20° C. of at least about 2,500 centipoise.

15. The hydroxyethyl cellulose of claim 14 wherein said Brookfield viscosity is at least about 5,000 centipoise.

16. The process of claim 13 wherein said hydroxyethyl cellulose starting material is the purified product resulting from the etherification of a cellulosic source contained in the diluent system in which said product was prepared.

17. The process of claim 13 wherein the diluent is a member selected from the group consisting of acetone, isopropanol and t-butanol.

18. The process of claim 17 wherein the diluent is acetone.

19. The process of claim 18 wherein the water content of the diluent system is from about 5 to about 20 percent, based upon the total weight of acetone and water.

20. The process of claim 19 wherein the water content is in the range of about 7 to about 13 percent by weight.

21. The process of claim 13 wherein the weight ratio of the diluent to the hydroxyethyl cellulose starting material is in the range of from about 4:1 to about 25:1.

22. The process of claim 13 wherein the diluent to hydroxyethyl cellulose starting material weight ratio is in the range of from about 5:1 to about 10:1.

23. The process of claim 13 wherein said inert gas is nitrogen.

24. The process of claim 13 wherein said alkaline material is sodium hydroxide.

25. The process of claim 24 wherein the molar ratio of sodium hydroxide to said hydroxyethyl cellulose is in the range of from about 0.4:1 to about 1:1.

26. The process of claim 13 wherein said reactant is glycidol.

27. The process of claim 26 wherein said reactant is distilled glycidol.

28. The process of claim 26 wherein said reactant is crude glycidol.

29. The process of claim 13 wherein said reactant is 2,3-epoxy-1,4-butanediol.

30. The process of claim 13 wherein said reactant is added in an amount sufficient to provide a degree of substitution in the hydroxyethyl cellulose starting material in the range of from about 0.3 to about 1.3.

31. The process of claim 30 wherein said reactant is added in an amount sufficient to provide a degree of substitution in the range of from about 0.5 to about 1.2.

32. The process of claim 13 wherein said reactant is added over a period of at least one hour.

33. The process of claim 13 wherein the hydroxyethyl cellulose product recovered is washed to remove impurities and then dried.

34. A viscosified fluid comprising water, an effective viscosifying amount of a crosslinked water-soluble cellulose ether containing pendent vic dihydroxy structure having or capable of assuming a cis geometry, and a polyvalent metal cross-linker, said cellulose ether having a shear-thermal stability characteristic of at least about 30 at 250° F. for a 0.6 percent by weight aqueous solution of said cellulose ether crosslinked by a polyvalent metal ion.

35. The viscosified fluid of claim 34 wherein said fluid includes a proppant.

36. The viscosified fluid of claim 34 wherein said fluid includes a gravel pack material.

37. The viscosified fluid of claim 34 wherein said fluid includes an acid.

38. The viscosified fluid of claim 34 wherein the shear-thermal stability characteristic of said cellulose ether is at least about 60.

39. The viscosified fluid of claim 38 wherein the shear-thermal stability characteristic of said cellulose ether is at least about 90.

40. The viscosified fluid of claim 34 wherein said pendent vic dihydroxy structure is present in an amount to provide a degree of substitution of from about 0.3 to about 1.3.

41. The viscosified fluid of claim 40 wherein the degree of substitution is in the range of from about 0.5 to about 1.2.

42. The viscosified fluid of claim 34 wherein said pendent vic dihydroxy structure comprises the residue of glycidol.

43. The viscosified fluid of claim 34 which includes a buffer to maintain the pH in the range of from about 6 to about 9.

44. The viscosified fluid of claim 34 wherein said cellulose ether is a hydroxyethyl cellulose, a hydroxypropylhydroxyethyl cellulose, a carboxymethyl cellulose or a hydroxypropyl cellulose.

45. The viscosified fluid of claim 44 wherein said cellulose ether is hydroxyethyl cellulose.

46. The viscosified fluid of claim 45 wherein said water-soluble hydroxyethyl cellulose has, as a 1 percent by weight solution in water, a Brookfield viscosity at 20° C. of at least about 1,200 centipoise.

47. The viscosified fluid of claim 46 wherein said Brookfield viscosity is at least about 1800.

48. The viscosified fluid of claim 46 wherein said Brookfield viscosity is at least about 2500.

* * * * *